United States Patent [19]

Eizember

[11] 4,127,610

[45] Nov. 28, 1978

[54] DINITROANILINE PURIFICATION WITH BROMINE AND CHLORINE

[75] Inventor: Richard F. Eizember, Greenwood, Ind.

[73] Assignee: Eli Lilly and Company, Indianapolis, Ind.

[21] Appl. No.: 878,835

[22] Filed: Feb. 17, 1978

Related U.S. Application Data

[63] Continuation-in-part of Ser. No. 825,345, Aug. 17, 1977.

[51] Int. Cl.² ............................................ C07C 85/26
[52] U.S. Cl. .................................................. 260/582
[58] Field of Search ........................................ 260/582

[56] References Cited

U.S. PATENT DOCUMENTS

| 3,314,996 | 4/1967 | Luberoff et al. | 260/582 |
| 3,317,606 | 5/1967 | Luberoff et al. | 260/582 |

FOREIGN PATENT DOCUMENTS

377,859  6/1923  Fed. Rep. of Germany ... 260/582 UX

OTHER PUBLICATIONS

"Russian Chem. Rev.", 40 (1), pp. 34–50 (1971).
"Chem. Zentr.", 1, p. 964 (1924).
"Lieb. Ann.", 151, p. 366 (1869).

*Primary Examiner*—Paul F. Shaver
*Attorney, Agent, or Firm*—Kathleen R. S. Page; Arthur R. Whale

[57] ABSTRACT

The present invention is directed to a process for the removal of nitrosamines from dinitroanilines.

21 Claims, No Drawings

DINITROANILINE PURIFICATION WITH BROMINE AND CHLORINE

CROSS REFERENCE TO RELATED APPLICATION

This is a continuation-in-part of my copending application Ser. No. 825,345, filed Aug. 17, 1977.

SUMMARY

The dinitroaniline class compounds includes numerous commercial herbicides. Recently a new analytical device, known as a thermal energy analyzer (TEA), has been developed (*J. Chromatogr.* 107 (1975), 351 and references there cited; and "N-Nitroso Compounds in the Environment," IARC Scientific Publication #9 (International Agency for Research on Cancer, Lyon, 1974), p. 40). The TEA analyzes specifically for the nitroso (—NO) group, and is capable of detecting the nitroso group at concentrations as low as 0.02 ppm — much lower than prior analytical techniques. Analysis of various dinitroanilines by the TEA reveals that some of the dinitroanilines contain very small amounts of nitrosamines. The presence of even a very small amount of nitrosamine is viewed as undesirable, because certain of the nitrosamines have been shown to be carcinogenic in animals.

The present invention provides a method for removing nitrosamines from dinitroanilines.

DETAILED DESCRIPTION

The present invention is directed to a process which comprises contacting a nitrosamine-containing dinitroaniline selected from the group consisting of
  trifluralin,
  isopropalin,
  benefin,
  butralin,
  tendimethalin,
  fluchloralin,
  profluralin,
  dinitramine,
  4-trifluoromethyl-2,6-dinitro-3-chloro-N,N-diethylaniline,
  4-methyl-2,6-dinitro-N,N-bis(2-chloroethyl)aniline,
  oryzalin, and
  nitralin,
(1) in liquid phase,
(2) with a reagent selected from the group consisting of molecular bromine, molecular chlorine, N-bromosuccinimide, N-chlorosuccinimide, bromine chloride, pyridine perbromide, and pyridinium bromide perbromide, until the concentration of the nitrosamine has been reduced.

Dinitroanilines with which the present invention can be practiced (and their generic names where available) are (1) 4-trifluoromethyl-2,6-dinitro-N,N-di-n-propylaniline (trifluralin);
(2) 4-isopropyl-2,6-dinitro-N,N-di-n-propylaniline (isopropalin);
(3) 4-trifluoromethyl-2,6-dinitro-N-n-butyl-N-ethylaniline (benefin);
(4) 4-tert-butyl-2,6-dinitro-N-sec-butylaniline (butralin);
(5) 3,4-dimethyl-2,6-dinitro-N-(1-ethylpropyl)aniline (tendimethalin);
(6) 4-trifluoromethyl-2,6-dinitro-N-propyl-N-(2-chloroethyl)aniline (fluchloralin);
(7) 4-trifluoromethyl-2,6-dinitro-N-propyl-N-(cyclopropylmethyl)aniline (profluralin);
(8) 4-trifluoromethyl-2,6-dinitro-3-amino-N,N-diethylaniline (dinitramine);
(9) 4-trifluoromethyl-2,6-dinitro-3-chloro-N,N-diethylaniline (intermediate to dinitramine);
(10) 4-methyl-2,6-dinitro-N,N-bis(2-chloro-ethyl)aniline;
(11) 4-sulfamoyl-2,6-dinitro-N,N-di-n-propylaniline (oryzalin); and
(12) 4-(methylsulfonyl)-2,6-dinitro-N,N-di-n-propylaniline (nitralin).

Preferred dinitroanilines with which the present invention is carried out are trifluralin, isopropalin, and benefin.

Generally, the dinitroanilines are prepared by a reaction route of which the following, for trifluralin, is typical:

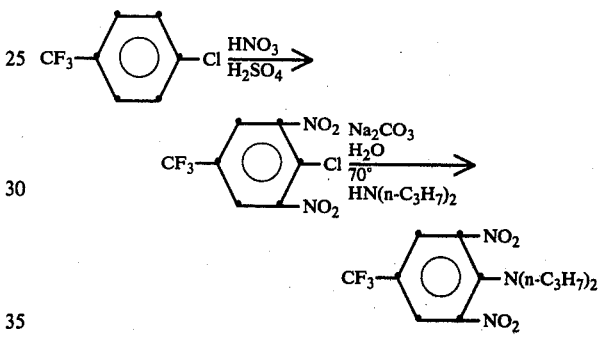

It is believed that small amounts of nitrogen oxides remaining from the nitration step react with a portion of the amine during the amination step, generating small amounts of nitrosamine which may appear in the final dinitroaniline product. Therefore, any nitrosamine contaminant is expected to be the nitroso derivative of the alkylamine employed. However, it is conjectured that exceedingly small amounts of yet other nitrosamines may also be formed. The removal of nitrosamines, regardless of identity, is desirable, and the present process meets the objective.

The mechanism by which the present process operates is not known with certainty. It is known, however, that the nitrosamine is converted, "denitrosated," to a substance not containing the nitrosamine group; and it is believed but not yet proven that NOBr or NOCl may be generated as part of the denitrosation.

The present process provides substantial reduction in nitrosamine concentration, regardless of the initial amount of nitrosamine. The process has been conducted with dinitroanilines containing from as little as about 10 ppm of nitrosamine to as much as several thousand ppm of nitrosamine; nitrosamine concentration is generally reduced to about one-tenth of the initial amount, or less. In many cases, the nitrosamine concentration is reduced to less than about 1 ppm.

The present process is conducted in a liquid phase. In the case of those dinitroanilines melting at lower temperatures, such as below about 140° C., this is preferably achieved by heating the nitrosamine-containing dinitroaniline to its melting temperature or somewhat higher. Trifluralin melts at about 54°–5° C. and benefin melts at about 65°–6° C. Isopropalin melts at about 30° C. but because of minor impurities is generally liquid at room temperatures. Additionally, a liquid phase can be acheived by dissolving the nitrosamine-containing dinitroaniline in a solvent. Suitable solvents including aliphatic alcohols such as methanol and ethanol; and halogenated aliphatic hydrocarbons, such as chloroform, methylene chloride, and carbon tetrachloride. Solvents which are highly reactive with molecular bromine or chlorine are unsuitable.

Molecular bromine and molecular chlorine are the most suitable reagents, and of these, bromine is especially preferred. However, N-bromosuccinimide, N-chlorosuccinimide, bromine chloride, pyridine perbromide, and pyridinium bromide perbromide can also be employed. The amount of reagent to be employed is not critical, so long as the amount is sufficient to reduce the initial amount of nitrosamine to a lesser amount. When employing bromine, 0.02 to 2.0 grams of reagent per 100 grams of dinitroaniline is satisfactory; about 0.2 gram of reagent per 100 grams of dinitroaniline appears to be optimal. When using chlorine, 15 ml/min. to 100 ml/min. of chlorine gas per 100 grams of dinitroaniline is satisfactory; about 35 ml/min. of chlorine gas per 100 grams of dinitroaniline appears optimal. When employing N-bromosuccinimide, N-chlorosuccinimide, bromine chloride, pyridine perbromide or pyridinium bromide perbromide, amounts of 0.05 to 5.0 gram of reagent per 100 grams of dinitroaniline are suitable.

The reaction can be conducted at temperatures over a wide range. In general, temperatures below about 140° C. are employed and temperatures below about 120° C. are preferred because of the greater risk of side reactions at higher temperatures. When conducting the process neat, the reaction is conducted at temperatures above the melting temperature of the particular dinitroaniline. When conducting the process neat with trifluralin, isopropalin, and benefin, good results have been obtained at temperatures of from 70° to 90° C. for all reagents except chlorine; with chlorine, temperatures of from 90° to 120° C. are preferred. The reaction can be conducted at atmospheric pressures or at elevated pressures.

The rate at which the present process proceeds will vary with the concentration of the nitrosamine, temperature, the reagent, the rate of its addition, and other factors. Neither the presence of water, alone, nor the presence of water at neutral or acidic pH is deleterious; however, the presence of water at alkaline pH is disadvantageous, so that a pH of less than 8 is preferred when a significant amount of water is present in the reaction mixture. The progress of nitrosamine removal can be monitored by gas chromatography or by TEA analysis. Denitrosation is generally complete in less than an hour. Time studies of the present process have shown an early drop in levels of nitrosamine, followed in some instances by a slight rise in levels of nitrosamine upon extended reaction time. It is believed that extended exposure of (1) the dinitroaniline and (2) the denitrosation products, to the reaction conditions may result in further nitrosamine formation. Therefore, minimizing reaction times is desirable.

When the reaction is conducted neat, no workup is required. If desired, workup is conventional and takes the form of bubbling air through the reaction mixture or blowing air over the surface of the reaction mixture, followed by a carbonate wash.

The following examples illustrate the present invention and will enable those skilled in the art to practice the invention.

Unless otherwise noted, determination of nitrosamine concentration in the following examples was done by a gas chromatographic method sensitive down to about 0.5 ppm. A "non-detectable" reading (reported below as "N.D.") was considered to represent less than about 0.5 ppm of nitrosamine. A Hewlett-Packard Model 5711A gas chromatograph was used but the method can be carried out with any gas chromatograph apparatus equipped with a flame ionization detector. The column was a glass coil 4 ft. × ⅛ inch i.d., packed with 3% Carbowax 20M on 100/120 mesh AW DMCS Chromosorb G operated at 100° C. After the nitrosamine peak eluted, the column was heated to 230° C. and held there for about 15 minutes. The helium flow rate was 60 ml/min. A standard of approximately the same concentration of the nitrosamine expected in the sample was employed. Both standard and sample were prepared in methylene chloride.

Those examples utilizing TEA analysis are so indicated. Analyses by this method were carried out in essentially the same procedures as described in *J. Chromatogr.* 109 (1975), 271. In the context of the present invention, this method is considered to be sensitive to nitrosamine concentrations as low as about 0.05 ppm. Where TEA analysis of the samples reported below showed no nitrosamine, it is reported as "N.D."

EXAMPLE 1: NITROSAMINE REMOVAL FROM TRIFLURALIN, BROMINE

A 30 gram portion of a lot of trifluralin with an average assay of 68 ppm of nitrosamine was melted and 0.2 gram (about 10 drops) of bromine was added. The mixture was heated to 70° C. and maintained at that temperature, with stirring, for 30 minutes. A sample was analyzed for nitrosamine; none could be detected.

EXAMPLE 2: NITROSAMINE REMOVAL FROM TRIFLURALIN, LESSER AMOUNT OF BROMINE

The process of Example 1 was repeated except that only 2 drops (0.04 gram) of bromine were added. By gas chromatography, no nitrosamine was detected. TEA analysis showed 0.03 ppm of nitrosamine.

EXAMPLE 3: NITROSAMINE REMOVAL FROM TRIFLURALIN, BROMINE, HIGHER TEMPERATURE, CARBONATE WASH

Trifluralin (30 grams of a sample containing 14 ppm of nitrosamine) was heated to 90° C. Bromine (0.1 gram) was added and the reaction mixture was maintained at 90° C., with stirring, for 30 minutes. The reaction mixture was then washed with 5 ml of a 10% solution of sodium carbonate. The layers were separated and a sample of the organic layer was analyzed for nitrosamine content. It showed 1.4 ppm of nitrosamine. The water layer was extracted with 5 ml of methylene chloride; a sample of the extract was analyzed for nitrosamine content and showed 0.15 μg/ml.

EXAMPLE 4: NITROSAMINE REMOVAL FROM TRIFLURALIN, BROMINE, WORKUP WITH AIR

A 27 gram sample of trifluralin containing 1750 ppm of nitrosamine was heated at 70° C. and bromine (0.2 gram) was added. The reaction mixture was maintained at 70° C. with stirring, for 55 minutes. During the last 10 minutes, air was blown over the surface. A sample was then taken and analyzed for nitrosamine content. It showed 12 ppm of nitrosamine.

EXAMPLE 5: NITROSAMINE REMOVAL FROM TRIFLURALIN, BROMINE, TIME STUDY

A 100 gram portion of a lot of trifluralin with an average assay of 68 ppm of nitrosamine was heated to 70° C. and bromine (0.2 gram) was added. The reaction mixture was maintained at 70° C., with stirring, for 2 hours. Samples were periodically taken and analyzed for nitrosamine content. The results were as follows:

| Time at which sample taken | Nitrosamine concentration |
| --- | --- |
| 5 min | 3.2 ppm |
| 15 min | 2.8 ppm |
| 30 min | 2.2 ppm |
| 1 hour | 14 ppm |
| 2 hours | 27 ppm |

Another sample taken at 2 hours was analyzed for trifluralin by vapor phase chromatography and determined to be 97.2% pure.

EXAMPLE 6: NITROSAMINE REMOVAL FROM TRIFLURALIN, LARGER AMOUNT OF BROMINE

A 30 gram portion of a lot of trifluralin with an average assay of 68 ppm of nitrosamine was heated to 70° C. and bromine (3.11 grams) was added. The reaction mixture was maintained at 70° C., with stirring, for 30 minutes. The reaction mixture turned dark and some dark polymeric material was observed. Samples were analyzed for nitrosamine and purity of trifluralin. No nitrosamine was detected; purity was 82.5%.

EXAMPLE 7: NITROSAMINE REMOVAL FROM TRIFLURALIN, BROMINE, EFFECT OF WATER

A 30 gram portion of a lot of trifluralin with an average assay of 68 ppm of nitrosamine was heated to 70° C. and added to 6 grams of water. Bromine (0.2 gram) was added. The reaction mixture was maintained at 70° C., with stirring, for 30 minutes. The layers were separated. A sample of the organic layer analyzed for nitrosamine content showed <1 ppm.

EXAMPLES 8 and 9: NITROSAMINE REMOVAL FROM TRIFLURALIN, BROMINE, ACID CONDITIONS Two reactions were conducted under identical conditions except that in one, 0.5 ml of concentrated hydrochloric acid was used, and in the other, 0.5 ml of 50% sulfuric acid was used.

In each reaction, a 30 gram portion of a lot of trifluralin with an average assay of 68 ppm of nitrosamine, water (3 ml), and the respective acid were mixed and heated to 70° C. Bromine (0.2 gram) was added and the mixture maintained at 70° C., with stirring, for 20 minutes. The layers were then separated. The acid layer was neutralized and extracted with an equal volume of methylene chloride. Samples of the product layer and the methylene chloride extract were analyzed for nitrosamine content. The results were as follows:

| Acid | Nitrosamine Concentration | |
| --- | --- | --- |
| | product | methylene chloride extract |
| Ex. 8 (Concentrated hydrochloric acid) | 4.8 ppm | 1.4 μg/ml. |
| Ex. 9 (50% sulfuric acid) | N.D. | N.D. |

EXAMPLE 10: NITROSAMINE REMOVAL FROM TRIFLURALIN, CHLORINE

A 30 gram portion of a lot of trifluralin with an average assay of 68 ppm of nitrosamine was heated to 70° C. Chlorine gas was bubbled into the trifluralin at a rate of approximately 35 ml/min. for 30 minutes, and air was then bubbled into trifluralin for another 5 minutes. The trifluralin was maintained throughtout at 70° C. A sample was analyzed and showed 16 ppm of nitrosamine.

EXAMPLE 11: NITROSAMINE REMOVAL FROM TRIFLURALIN, CHLORINE AT ELEVATED TEMPERATURE AND WITH WATER ADDED

Water (1 ml) and a 30 gram portion of a lot of trifluralin with an average assay of 68 ppm of nitrosamine were mixed and heated to 90° C. Chlorine gas was bubbled into the mixture at a rate of approximately 35 ml/min for 30 minutes, then air was bubbled through for 10 minutes. The reaction mixture was maintained throughout at 90° C. A sample was analyzed and showed 13 ppm of nitrosamine.

EXAMPLE 12: NITROSAMINE REMOVAL FROM TRIFLURALIN, TIME STUDY OF CHLORINE AT ELEVATED TEMPERATURE WITH CARBONATE WASH

A 30 gram portion of a lot of trifluralin with an average assay of 68 ppm of nitrosamine was heated and maintained at 110° C. A 10% sodium carbonate solution (2 ml) was added, the chlorine was bubbled in at a rate of 15 ml/min. Samples were taken periodically. Of each sample, the layers were separated and the product layer was analyzed for nitrosamine content. The results were as follows:

| Time when sample taken | Nitrosamine Concentration |
| --- | --- |
| 30 min | 15 ppm |
| 1 hour | 28 ppm |
| 2 hours | 1.2 ppm |

EXAMPLE 13: NITROSAMINE REMOVAL FROM TRIFLURALIN, N-BROMOSUCCINIMIDE

A 30 gram portion of a lot of trifluralin with an average assay of 68 ppm of nitrosamine was heated to 70° C. and 0.5 gram of N-bromosuccinimide added. The reaction mixture was maintained at 70° C. for 30 minutes. A sample was analyzed and showed 1.7 ppm of nitrosamine.

EXAMPLE 14: NITROSAMINE REMOVAL FROM TRIFLURALIN, BROMINE WITH CARBONATE PRETREATMENT OF TRIFLURALIN

A 30 gram portion of a lot of trifluralin with an average assay of 68 ppm was melted and washed with 15 ml of 5% sodium carbonate solution. The layers were separated. Bromine (0.1 gram) was added to the trifluralin layer at 70° C. and the mixture was maintained at 70° C. for 30 minutes. A sample was analyzed for nitrosamine content. None was detected.

EXAMPLE 15: NITROSAMINE REMOVAL FROM DINITRAMINE, BROMINE

To a 10 gram sample of dinitramine containing 138 ppm of nitrosamine, at 110° C., 0.2 gram of bromine was added below the surface. The reaction mixture turned dark. It was stirred for 30 minutes and a 2 gram sample (designated A) removed. The remaining 8 grams was added slowly to 60 ml. of methylene chloride and 15 ml. of 10 percent sodium carbonate solution was added. The organic layer was separated and solvent removed on a rotary evaporator for 15 minutes at 45° C. (Sample B).

Each sample was analyzed for nitrosamine content by TEA. The results were as follows:

| Sample | Nitrosamine Concentration |
|---|---|
| A | <0.2 |
| B | 0.3 |

I claim:

1. The process which comprises contacting a nitrosamine-containing dinitroaniline selected from the group consisting of
   trifluralin,
   isopropalin,
   benefin,
   butralin,
   tendimethalin,
   fluchloralin,
   profluralin,
   dinitramine,
   4-trifluoromethyl-2,6-dinitro-3-chloro-N,N-diethylaniline,
   4-methyl-2,6-dinitro-N,N-bis(2-chloroethyl)aniline,
   oryzalin, and
   nitralin,
   (1) in liquid phase,
   (2) with a reagent selected from the group consisting of molecular bromine, molecular chlorine, N-bromosuccinimide, N-chlorosuccinimide, bromine chloride, pyridine perbromide, and pyridinium bromide perbromide, until the concentration of the nitrosamine has been reduced.

2. The process of claim 1 in which the dinitroaniline is trifluralin, isopropalin, or benefin.

3. The process of claim 2 in which the dinitroaniline is trifluralin.

4. The process of claim 2 in which the dinitroaniline is isopropalin.

5. The process of claim 2 in which the dinitroaniline is benefin.

6. The process of claim 2 in which the reagent is molecular bromine.

7. The process of claim 6 conducted neat at temperatures of 70°–90° C.

8. The process of claim 7 in which the dinitroaniline is trifluralin.

9. The process of claim 7 in which the dinitroaniline is isopropalin.

10. The process of claim 7 in which the dinitroaniline is benefin.

11. The process of claim 2 in which the reagent is molecular chlorine.

12. The process of claim 11 conducted neat at temperatures of 90°–120° C.

13. The process of claim 12 in which the dinitroaniline is trifluralin.

14. The process of claim 12 in which the dinitroaniline is isopropalin.

15. The process of claim 12 in which the dinitroaniline is benefin.

16. The process of claim 1 in which the dinitroaniline is butralin.

17. The process of claim 1 in which the dinitroaniline is tendimethalin.

18. The process of claim 1 in which the dinitroaniline if fluchloralin.

19. The process of claim 1 in which the dinitroaniline is profluralin.

20. The process of claim 1 in which the dinitroaniline is dinitramine.

21. The process of claim 1 in which the dinitroaniline is 4-trifluoromethyl-2,6-dinitro-3-chloro-N,N-diethylaniline.

* * * * *